Patented Nov. 22, 1938

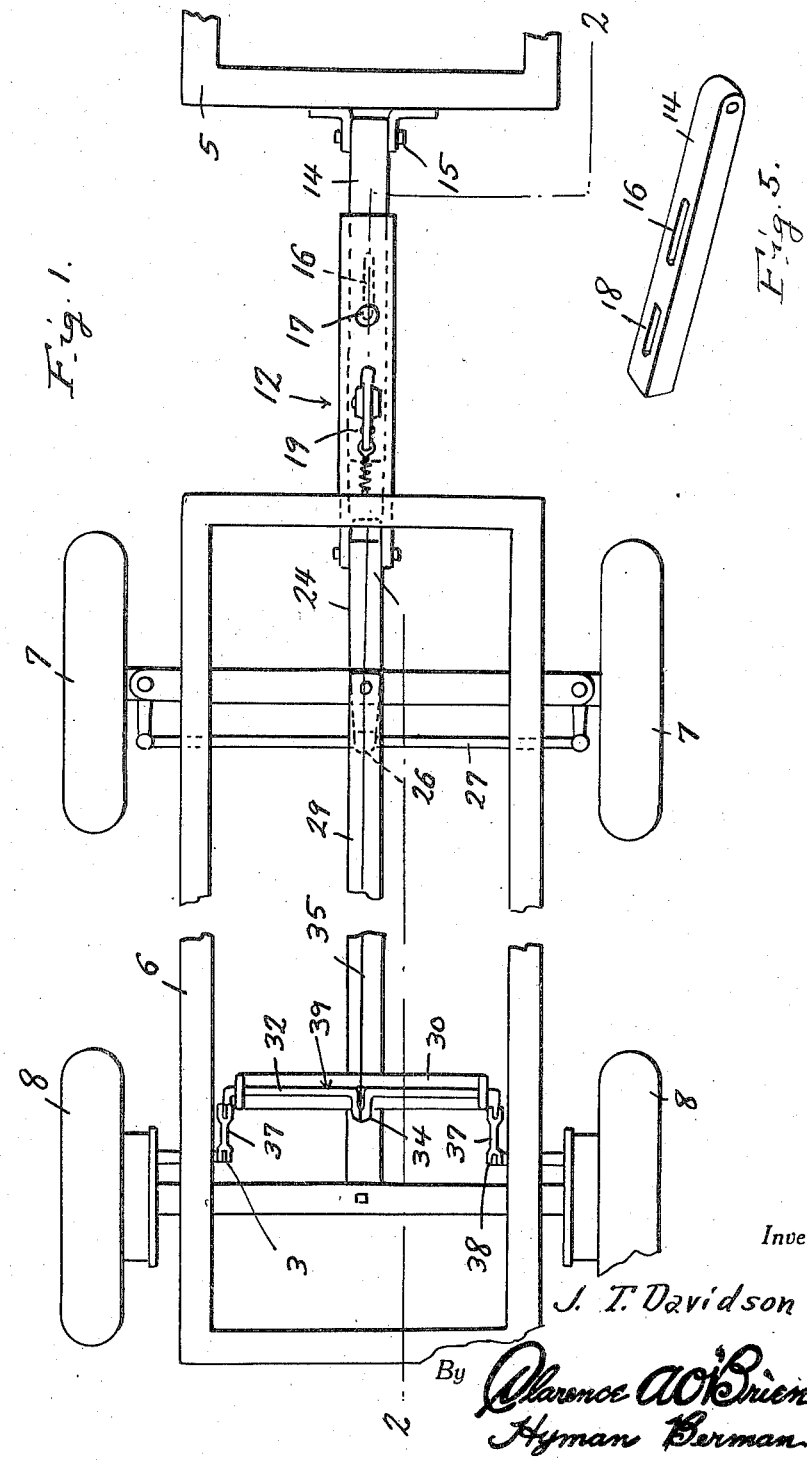

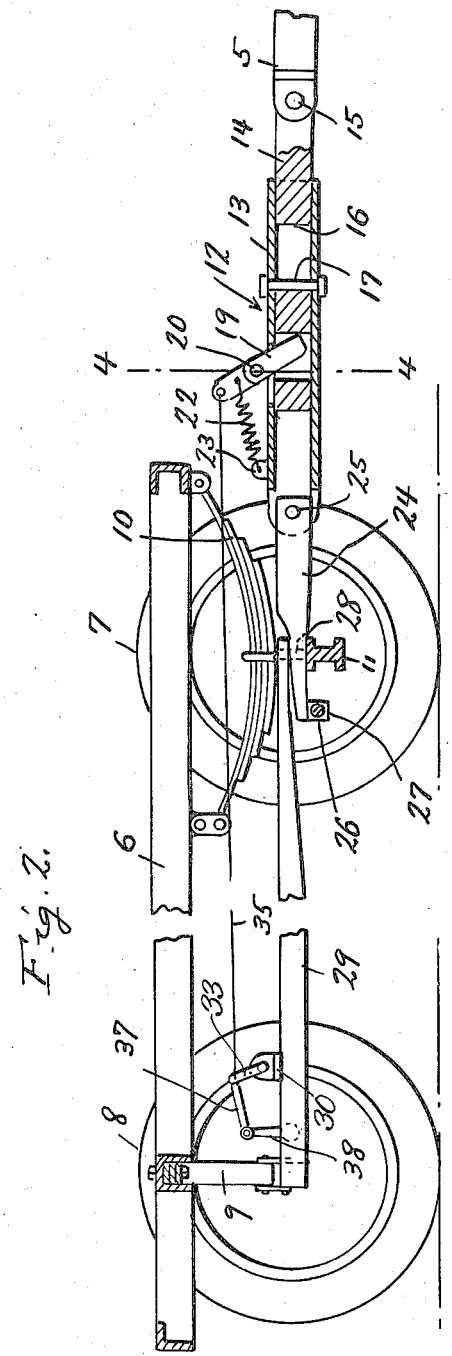
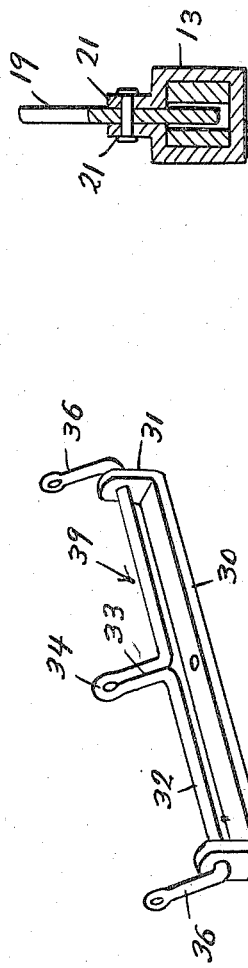

2,137,445

UNITED STATES PATENT OFFICE 2,137,445

TRAILER HITCH AND BRAKE OPERATOR

J. T. Davidson, Etowah, Ark.

Application February 8, 1938, Serial No. 189,461

1 Claim. (Cl. 188—142)

This invention appertains to new and useful improvements in trailer hitches and more particularly to a hitch involving means whereby the brakes of the attached trailer can be operated.

An important object of the invention is to provide a combination trailer hitch and brake operator whereby the brakes of a trailer can be operated as the lead vehicle is slowed down.

Other important objects and advantages of the invention will become apparent to the reader of the following specification.

In the drawings:—

Figure 1 represents a fragmentary top plan view showing the chassis of the trailer, the hitch and brake operating means.

Figure 2 represents a section on line 2—2 of Figure 1.

Figure 3 is a perspective view of the rocker.

Figure 4 is a cross section on line 4—4 of Figure 2.

Figure 5 is a perspective view of the draft bar.

Referring to the drawings wherein like numerals designate like parts, it can be seen that numeral 5 represents the chassis of the lead vehicle and numeral 6 denotes the chassis of the trailer. Numeral 7 represents the front wheels of the trailer while numeral 8 denotes the rear wheels, the rear wheels 8 being connected by the springs 9 to the chassis 6 and the front wheels 7 to the chassis 6 by the springs 10 in conjunction with the axle bar 11.

The coupling is generally referred to by numeral 12 and consists of the barrel 13 of square cross-section in which the draft bar 14 is slidably disposed. The draft bar 14 pivotally connects as at 15 to the lead vehicle frame 5 and has the slot 16 longitudinally therein through which the pin 17 passes, the pin being disposed also through the barrel 13.

The slide bar 14 also has the second slot 18 for receiving the lower end of the finger 19 which is rockably supported as at 20 by upstanding ears 21—21 on the barrel 13. A spring 22 serves to connect the upper end of the finger 19 to the ear 23 on the rear end of the barrel 13. An arm 24 pivotally secured as at 25 to the rear end of the barrel extends across the axle bar 11 and is secured as at 26 to the tie rod 27 of the steering mechanism of the trailer, the arm 24 being swingably secured as at 28 on the axle bar 11.

A bar 29 extends from the front axle 11 rearwardly as shown in Figure 2 and has mounted thereon the elongated plate 30 provided with the upstanding end portions 31—31 apertured to receive the horizontal shaft 32 the intermediate portion of which is bent laterally as at 33 and formed into an eye 34 into which can be tied the rear end of the cable 35, which cable extends from the upper end of the rockable finger 19.

The ends of the shaft 32 are bent laterally to provide arms 36—36 each of which is apertured and link members 37 extend from these arms 36 and pivotally attach to the levers 38 which operate the brake mechanisms of the rear wheels 8.

It can now be seen that when the lead vehicle slows down, the barrel 13 will ride over the bar 14 and cause forward movement of the upper end of the finger 19, pulling the cable 35 forwardly, so that through the rocker mechanism generally referred to by numeral 39 the brakes of the rear wheels 8 are operated automatically.

While the foregoing specification sets forth the invention in specific terms, it is to be understood that numerous changes in the shape, size, and materials may be resorted to without departing from the spirit and scope of the invention as claimed hereinafter.

Having described the invention what is claimed as new is:—

In combination with a trailer having front and rear wheels, brake means for the rear wheels and steering mechanism for the front wheels including a tie rod, a longitudinally extending arm pivotally supported intermediate its ends on the front axle of the trailer, means for connecting the rear end of the arm to the tie rod, an elongated barrel of non-circular shape in cross section having its rear end pivoted by a horizontal pivot to the front end of the arm, a drawbar slidably arranged in the barrel and having a pair of slots therein, a pin passing through the barrel and through one of the slots, the top part of the barrel having a slot therein, ears on the barrel, one on each side of the slot therein, a finger pivoted between the ears and passing through the slot in the barrel into the second slot of the drawbar, a spring connected with the upper part of the finger and to the rear part of the barrel and a member connected with the upper end of the finger and leading to the rear brake means for applying the brakes when the barrel and drawbar are moved relative to each other which results in movement of the finger.

J. T. DAVIDSON.